United States Patent
Kauppinen (10) Patent No.: US 7,200,396 B2
(45) Date of Patent: Apr. 3, 2007

(54) MANAGING GROUP VOICE COMMUNICATION IN TELECOMMUNICATIONS SYSTEM

(75) Inventor: Risto Kauppinen, Helsinki (FI)

(73) Assignee: Nokia Corporation, Espoo (FI)

( * ) Notice: Subject to any disclaimer, the term of this patent is extended or adjusted under 35 U.S.C. 154(b) by 98 days.

(21) Appl. No.: 10/883,985

(22) Filed: Jul. 6, 2004

(65) Prior Publication Data

US 2005/0260988 A1 Nov. 24, 2005

(30) Foreign Application Priority Data

May 19, 2004 (FI) .................................. 20045180

(51) Int. Cl.
*H04Q 7/20* (2006.01)
*H04Q 7/00* (2006.01)
*G06F 15/173* (2006.01)
*H04H 1/00* (2006.01)
*H04L 12/28* (2006.01)

(52) U.S. Cl. ................... 455/435.3; 455/518; 709/225; 370/312; 370/390; 370/266

(58) Field of Classification Search ................ 455/518; 709/225
See application file for complete search history.

(56) References Cited

U.S. PATENT DOCUMENTS

| | | | | |
|---|---|---|---|---|
| 6,067,457 A | * | 5/2000 | Erickson et al. ............ | 455/512 |
| 6,477,150 B1 | * | 11/2002 | Maggenti et al. ........... | 370/312 |
| 6,970,926 B1 | * | 11/2005 | Needham et al. ........... | 709/225 |
| 2002/0077136 A1 | | 6/2002 | Maggenti et al. | |
| 2003/0078064 A1 | * | 4/2003 | Chan ......................... | 455/514 |
| 2003/0187926 A1 | * | 10/2003 | Karjanlahti ................. | 709/204 |
| 2004/0077358 A1 | * | 4/2004 | Bennett et al. ............. | 455/455 |
| 2005/0032539 A1 | * | 2/2005 | Noel et al. .................. | 455/518 |

* cited by examiner

*Primary Examiner*—George Eng
*Assistant Examiner*—Kiet Doan
(74) *Attorney, Agent, or Firm*—Squire, Sanders & Dempsey L.L.P.

(57) ABSTRACT

The present solution relates to a telecommunications system where information is maintained of communication groups available to a user terminal (UE). A communication server (PoC server) of the system is able to receive a request message (3-1) sent by the user terminal (UE), the request message (3-1) comprising an indication of the communication group the user wishes to speak to. If the request can be accepted, the communication server (PoC server) transmits a floor granted message (3-2) to the user terminal (UE). According to the present solution the communication group requested by the user is set (3-3) as the priority communication group for said user at least for a predetermined time period.

8 Claims, 5 Drawing Sheets

MANAGING GROUP VOICE COMMUNICATION IN TELECOMMUNICATIONS SYSTEM

FIELD OF THE INVENTION

The present invention relates to managing multiple sessions in group voice communication.

BACKGROUND OF THE INVENTION

One special feature offered in mobile communications systems is group communication. Conventionally group communication has been available in trunked mobile communications systems, such as Professional Radio or Private Mobile Radio (PMR) systems, such as TETRA (Terrestrial Trunked Radio), which are special radio systems primarily intended for professional and governmental users, such as the police, military forces, oil plants.

Group communication with a push-to-talk feature is one of the essential features of any PMR network. Generally, in group voice communication with a "push-to-talk, release-to-listen" feature, a group call is based on the use of a pressel (push-to-talk button) as a switch. By pressing the pressel the user indicates his/her desire to speak, and the user equipment sends a service request to the network. The network either rejects the request or allocates the requested resources on the basis of predetermined criteria, such as the availability of resources, priority of the requesting user, etc. At the same time, a connection is also established to other users in the specific subscriber group. After the voice connection has been established, the requesting user can talk and the other users can listen on the channel. When the user releases the pressel, the user equipment signals a release message to the network, and the resources are released. Thus, the resources are reserved only for the actual speech transaction or speech item, instead of reserving the resources for a "call".

The group communication is now becoming available also in public mobile communications systems. New packet-based group voice and data services are being developed for cellular networks, especially in the evolution of the GSM/GPRS/UMTS network. In some approaches, the group communication service, and also one-to-one communication, is provided as a packet-based user or application level service so that the underlying communications system only provides the basic connections (i.e. IP connections) between the group communications applications in the user terminals and the group communication service. The group communication service can be provided by a group communication server system while the group client applications reside in the user equipment or terminals. When this approach is employed for push-to-talk communication, the concept is also referred to as Push-to-talk over Cellular (PoC) network. Push-to-talk over Cellular is an overlay speech service in a mobile cellular network where a connection between two or more parties is established (typically) for a long period, but the actual radio channels in the air interface are activated only when somebody is talking. This corresponds to the use of the traditional radio telephones where the radio frequency used is agreed between the parties, and whenever somebody wants to talk he/she presses the push-button, which activates the radio transmission on the selected channel. Alternatively, a voice activity detector (VAD) or any suitable means can be used instead of the manual switch.

The PoC system may also be provided with multiple session support, meaning that a user may be a member of several communication groups. In that case, a user may participate in two or more simultaneous group "calls", also referred to as "sessions". However, the user is able to receive speech from one group at a time. If there are two or more incoming streams at the same time, only one of them can be transmitted to the user. It is possible to set one of the communication groups as a priority communication group. The priority communication group may be selected by the network. The priority communication group may be the group in which the current session was first initiated, or it may be the group in which the current speech was first transmitted. Alternatively, the priority communication group may be predetermined by the user; for example, it may be a group of particular relevance to the user. If there are two or more incoming voice streams at the same time, only the stream of the higher priority is transmitted to the user.

A problem associated with the above arrangement relates to a situation where the user has just spoken to a "non-priority" communication group and is waiting for a response from that non-priority communication group. If at the same time someone starts to speak from the priority communication group, the dialog from the priority communication group is transmitted to the user, and thus the user is not able to hear the eventual response from the non-priority group, although the response from the non-priority group might be of particular relevance to the user at that moment.

BRIEF DESCRIPTION OF THE INVENTION

An object of the present invention is to provide a method and an arrangement for implementing the method so as to overcome the above problem. The objects of the invention are achieved by a method, a system and a communication server, which are characterized by what is stated in the independent claims. Embodiments of the invention are disclosed in the dependent claims.

The present solution is based on the idea that the communication group the user has last spoken to is set as the priority communication for said user. The present solution comprises receiving, from the user terminal, a request message indicating the communication group the user wishes to speak to. As a response to receiving said message in the communication server, the requested communication group is set as the priority communication group for the user. Alternatively, after receiving the request message in the communication server, a granting message is transmitted from the communication server to the user terminal, and based on the transmitted granting message, the requested communication group is set as the priority communication group for the user.

An advantage of the method and arrangement of the present solution is that a user-specific on-line method for defining the priority communication group is achieved. By means of the solution, the communication group to which the user has last spoken is set as the priority communication group such that it can be assured that the user receives the eventual response from the other members of the group even if the communication group in question is originally a non-priority communication group, and at the same time someone from a group, originally of higher priority, starts to speak.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
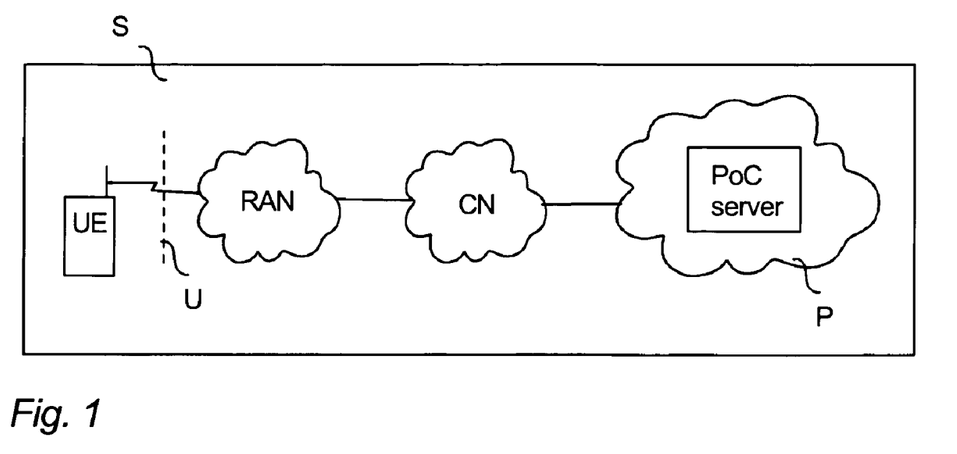
FIG. 1 illustrates the telecommunications system according to the present invention.

An example of a telecommunications system S to which the principles of the present solution may be applied will be described with reference to FIG. 1. In FIG. 1, a Push-to-talk over Cellular talk group server system P, comprising a PoC server, is provided on top of a packet switched Core Network CN in order to provide a packet mode (e.g. IP) voice, data and/or multimedia communication services to a User Equipment UE. The User Equipment UE accessing a Core Network CN, and the CN itself, utilize the packet-mode communication services provided by the Radio Access Network RAN between the User Equipment and the CN. The multiple access method employed in an air interface U in the RAN may refer to Time Division Multiple Access (TDMA), Frequency Division Multiple Access (FDMA), Code Division Multiple Access (CDMA), or to a combination thereof. In a $3^{rd}$ and higher generation mobile communications system the access method is primarily based on the CDMA. Further, because the traffic channels may have wide bandwidth, corresponding to user data rates e.g. up to 2 Mbit/s, such access may also be referred to as Wideband CDMA (WCDMA).

Push-to-talk over Cellular (PoC) is a speech service in a mobile network where a connection between two or more parties is established (typically) for a long period but the actual radio channels in the air interface are activated only when somebody is talking. With the PoC service the connections between the parties are typically established via a packet switched mobile network. In practice this means that a Voice over IP (VoIP) (group) call is set up between the parties. However, the difference with respect to a conventional phone call is that the radio channel of the subscribers is activated only when somebody needs to talk and released when nobody is talking.

The PoC system comprises several functional entities on top of the cellular network, which are not described in further detail here. The user functionality runs over the cellular network, which provides the data transfer services for the PoC system. The PoC system can also be seen as a core network using the cellular network as a radio access network. The underlying cellular network can be, for example, a general packet radio system (GPRS) or a third generation (3G) radio access network. The GPRS (or 3G) call control and the PoC both have specific call control mechanisms. The mobility of the users is handled by the underlying cellular network. It should also be appreciated that the present solution is not intended to be restricted to mobile stations and mobile systems but the terminal can be any terminal having a voice communication capability. For example, the user terminal may be a terminal (such as a personal computer PC) having Internet access and a VoIP capability for voice communication over the Internet.

Figure 2:
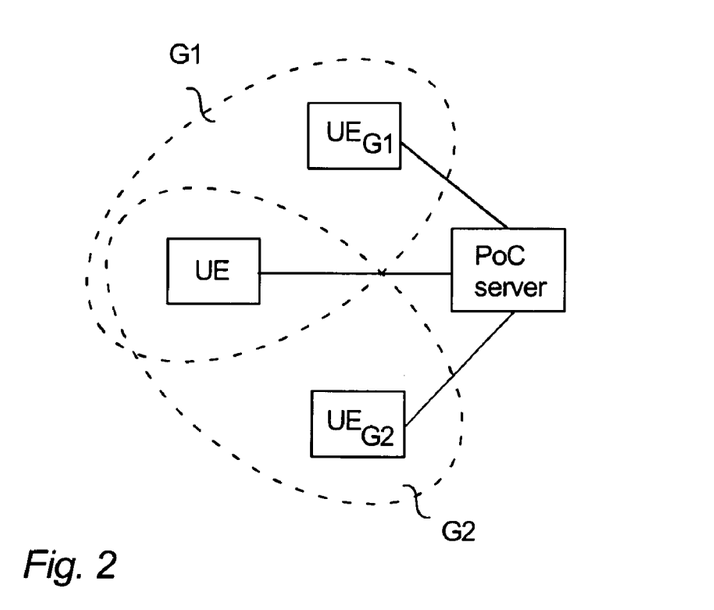
FIG. 2 illustrates the communication groups according to the present invention.

FIG. 2 illustrates a PoC system supporting multiple group communication. There may be a plurality of communication servers, i.e. PoC servers, in the PoC system, but for reasons of clarity only one PoC server is shown in FIG. 2. The PoC server may comprise control-plane functions and user-plane functions providing packet mode server applications that communicate with the communication client application(s) in the user equipment UE over the IP connections provided by the communication system. This type of communication includes signaling packets and voice or data communication packets. The control-plane function is responsible for control-plane management of the group communication. This may include, for example, managing the user activity and creation and deletion of logical user-plane connections with an appropriate control protocol, such as a Session Initiation Protocol (SIP). The user-plane function(s) is (are) responsible for the distribution of the data or speech packets to the user terminals according to their group memberships and other settings. The user-plane function forwards traffic only between valid connections programmed by the control-plane function. The basic user plane operation typically includes routing of the data or speech packet traffic from a sending user to the user-plane function, which then delivers the packet traffic to the receiving user(s). The PoC server may include further entities, such as a register and a subscriber and group management function. A user may be a member of several communication groups, and have access to media sessions taking place in these groups. In FIG. 2, an example is shown where the UE is a member of two communication groups G1, G2. However, the user is able to hear the dialog from only one group at a time. Thus, in case of two or more simultaneous sessions occurring in the groups, only a single voice stream coming from one of the sessions can be transmitted to the UE. It is possible to set one of the groups as a priority communication group for the user such that an eventual voice stream from the priority group is always transmitted to the user. Another possibility is to set the priority to a first initiated session or stream. Here it is assumed that G2 is the priority communication group for the UE. The term "group", as used herein, refers to any logical group of three or more users for participating in the same group communication, e.g. a speech call. In FIG. 2, for reasons of clarity, only two members, UE and $UE_{G1}$, participating in the group call in the communication group G1 and two members, UE and $UE_{G2}$, participating in the group call in the communication group G2 are shown. Here UE is a member of two communication groups G1 and G2, while $UE_{G1}$ belongs to G1 only and $UE_{G2}$ to G2 only. There may also be members in the communication group that are not currently participating in the respective group call. Those members may have switched off their terminals or they may not be on the coverage area of the call. Often the members of the communication group belong to the same organization, such as a service company, a distribution company, a construction company, etc. Also, the same organization may have several separate groups, i.e. a set of groups.

Figure 3:
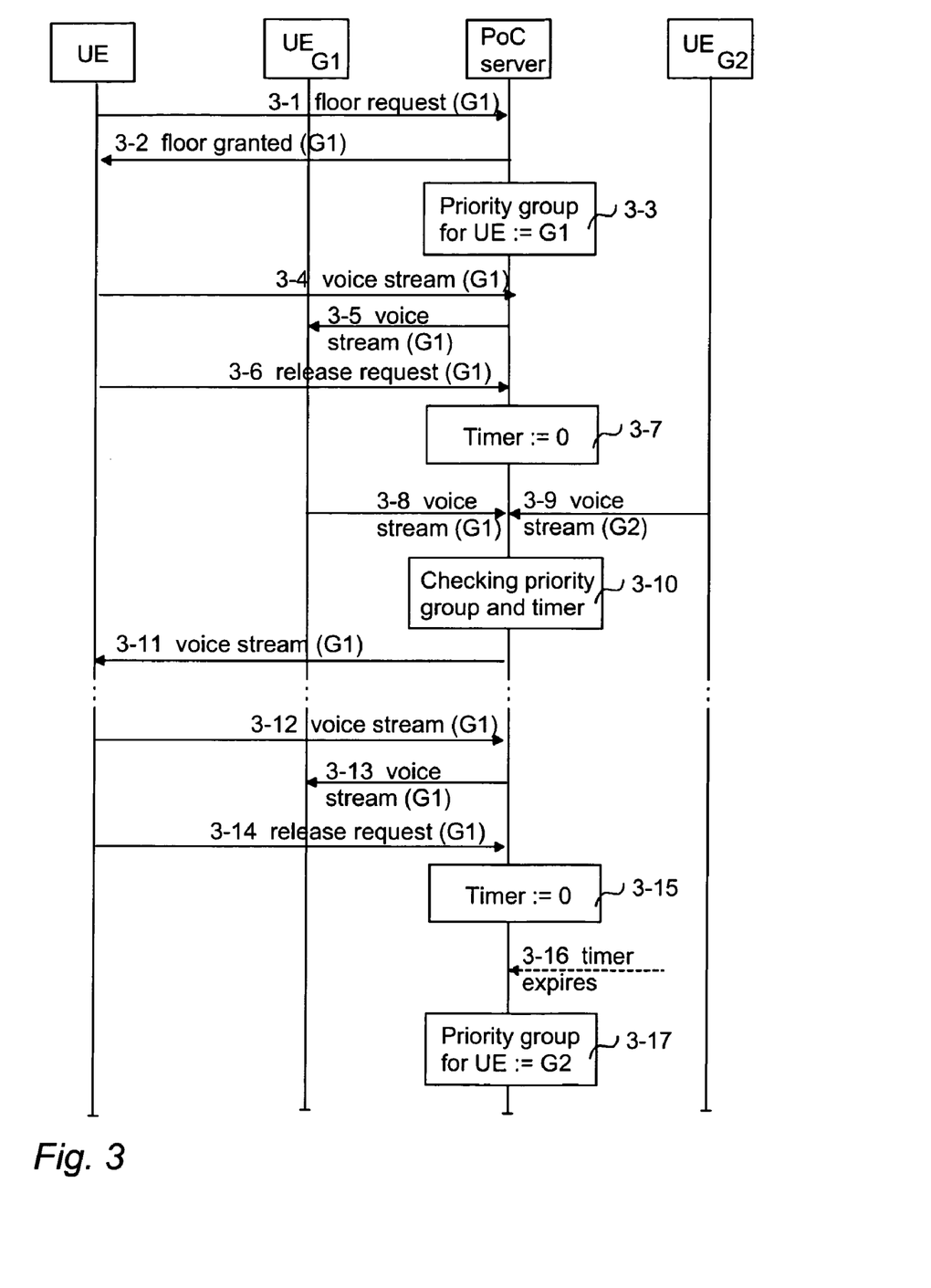
FIG. 3 illustrates the signaling according to a first embodiment of the present invention.

FIG. 3 illustrates, by way of example, the signaling according to a first embodiment of the present application. When the user wants to say something to the other member(s) in the PoC session, s/he presses the push-button in the user equipment UE. The push-button activates the speech codec, and a floor request message is transmitted 3-1 from the UE to the respective PoC server. In FIG. 3 it is assumed that the UE is a member of two communication groups G1, G2, and G2 is the priority communication group for the UE. The floor request message 3-1 indicates the communication group the user wishes to speak to. Here it is assumed that the user wishes to speak to the member(s) of the communication group G1. After receiving the floor request message in the PoC server, a floor granted message 3-2 is transmitted from the PoC server to the UE, indicating that the floor request has been accepted. After that, the requested communication group, here G1, is set 3-3 in the PoC server as the priority communication group for the UE. A voice stream (i.e. the user's speech) is transmitted 3-4, 3-5 from the UE via the PoC server to the other members of G1 that are currently participating in the respective group call, for example to $UE_{G1}$. According to the first embodiment, as a response to the ending of the voice stream (i.e. the user releasing the push-button, which is indicated to the PoC server by sending a floor release request message 3-6 from the UE to the PoC server) a respective timer is set to zero in the PoC server in step 3-7. The timer is set to expire after for example 10 seconds. In the messages 3-8 and 3-9 the PoC server receives simultaneous voice stream from members of two different communication groups, for example from $UE_{G1}$ and $UE_{G2}$. According to the first embodiment, in step 3-10 it is checked in the PoC server, whether either of the respective communication groups G1, G2 is the current priority group for the UE. Here it is assumed that the timer set in step 3-7 has not yet been expired, and thus group G1 is the priority group for the UE. As a result the voice stream 3-8 coming from $UE_{G1}$ is transmitted 3-11 to the UE while the voice stream 3-9 coming from $UE_{G2}$ cannot be transmitted to the UE. After that, another voice stream is transmitted 3-12, 3-13 from the UE via the PoC server to the other parties of the group call in G1, for example to $UE_{G1}$. (In reality, the voice stream 3-12 is preceded by a floor request—floor granted procedure corresponding steps 3-1 . . . 3-3 described above, but for reasons of clarity those steps are not shown here). After receiving a release request message 3-14, the timer is set to zero again in the PoC server in step 3-15. Then it is assumed that no response is received from any member G1 during a predetermined time period, and the timer reset in step 3-15 expires 3-16. As a response to the expiring of the timer, the original priority group G2 is set as the priority communication group for the UE in step 3-17.

Figure 4:
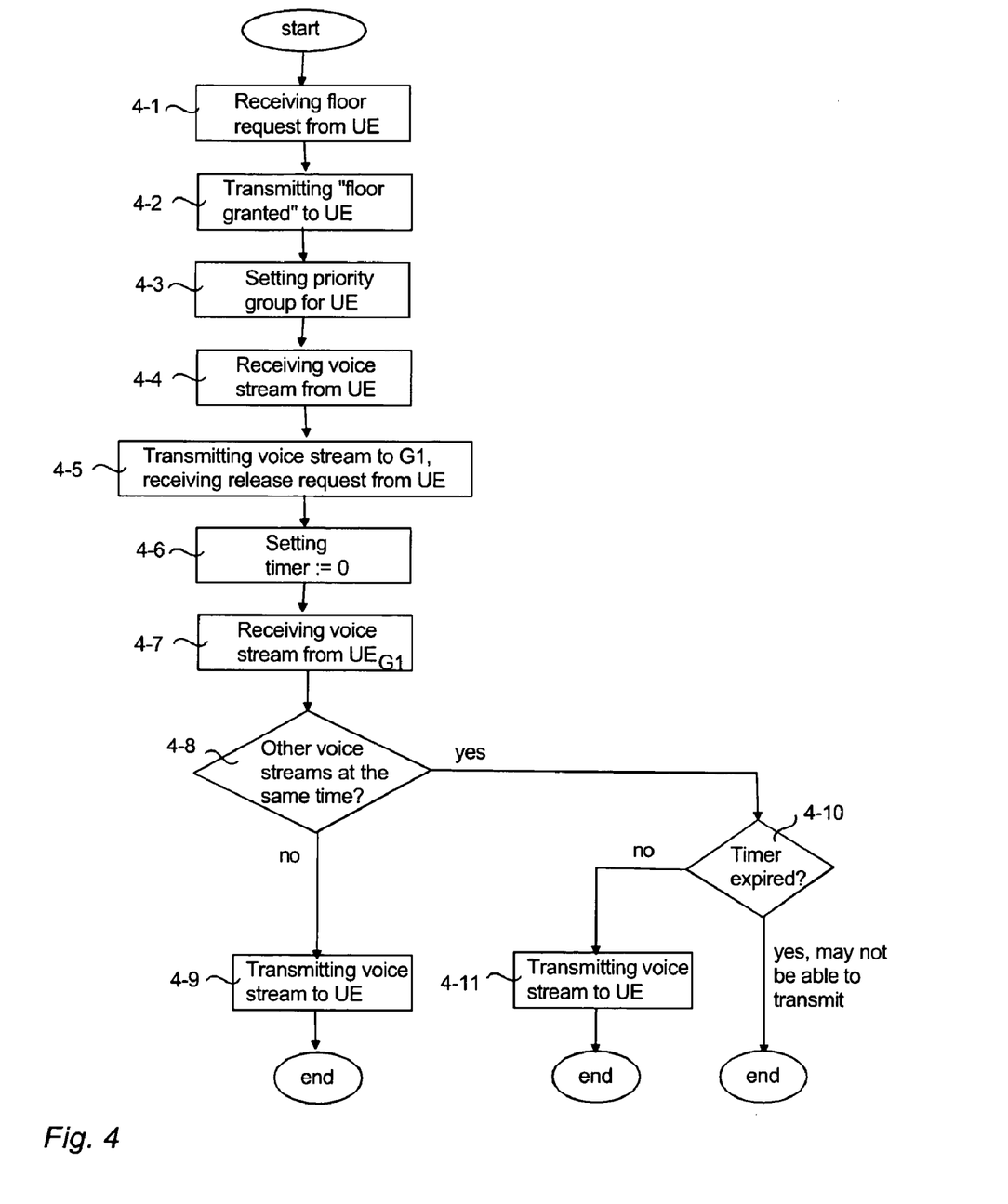
FIG. 4 is a flow chart illustrating the method according to a first embodiment of the present invention.

FIG. 4 illustrates, by way of example, the function of the PoC server according to the first embodiment of the present application. FIG. 4 shows a situation where a floor request message is received in the PoC server in step 4-1 from the user equipment UE. The received floor request message indicates the communication group the user wishes to speak to. Here it is assumed that the user wishes to speak to the communication group G1. It is further assumed that the UE is a member of two communication groups G1, G2, and G2 is originally the priority communication group for the UE. In step 4-2, a floor granted message is transmitted from the PoC server to the UE, indicating that the floor request has been accepted. After that, the requested communication group, here G1, is set as the priority communication group for the UE in step 4-3. In step 4-4 a voice stream is received from the UE. In step 4-5 the voice stream is transmitted to the other members of G1 participating the group call, for example to $UE_{G1}$, and a corresponding release request message is received from the UE. According to the first embodiment, as the release request message has been received in step 4-5, a respective timer is set to zero in the PoC server in step 4-6. In step 4-7 a voice stream is received from a member of the communication group G1, for example from $UE_{G1}$. In step 4-8, it is checked, whether the voice stream coming from $UE_{G1}$ is the only voice stream. If it is, it is transmitted to the UE in step 4-9. If there are other incoming voice streams, e.g. from $UE_{G2}$, it is checked in step 4-10, which is the priority group for the UE. If the timer set in step 4-6 has not expired, G1 is the priority group for the UE, and the voice stream from $UE_{G1}$ is forwarded to the UE in step 4-11. If the timer has expired, meaning that G2 (which was the original default priority group for the UE) has become the priority group for the UE, the voice stream coming from $UE_{G1}$ cannot be transmitted to the UE (instead the voice stream from $UE_{G2}$ is transmitted to the UE, not shown in FIG. 4).

Figure 5:
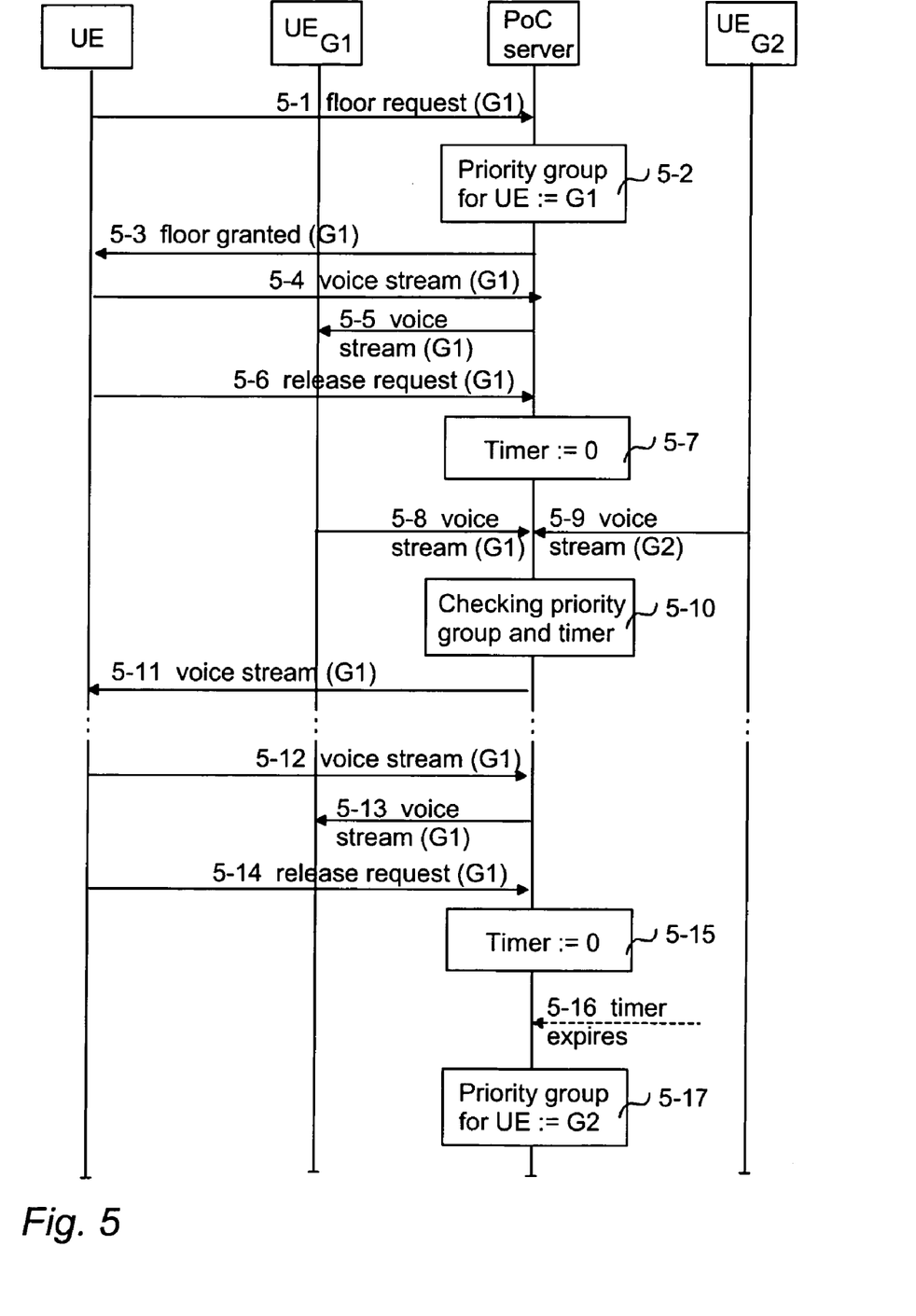
FIG. 5 illustrates the signaling according to a second embodiment of the present invention.

FIG. 5 illustrates, by way of example, the signaling according to a second embodiment of the present application. When the user wants to say something to the other member(s) in the PoC session, s/he presses the push-button in the user equipment UE. The push-button activates the speech codec, and a floor request message is transmitted 5-1 from the UE to the respective PoC server. In FIG. 5 it is assumed that the UE is a member of two communication groups G1, G2, and G2 is the priority communication group for the UE. The floor request message 5-1 indicates the communication group the user wishes to speak to. Here it is assumed that the user wishes to speak to the members of communication group G1. According to the second embodiment, after receiving the floor request in the PoC server, the requested communication group, here G1, is set 5-2 in the PoC server as the priority communication group for the UE. After that, a floor granted message 5-3 can be transmitted from the PoC server to the UE, indicating that the floor request has been accepted. A voice stream (i.e. the user's speech) is transmitted 5-4, 5-5 from the UE to the members of G1 participating in the respective group call, e.g. to $UE_{G1}$, via the PoC server. According to the embodiment, as a response to the ending of the voice stream (i.e. the user releasing the push-button, which is indicated to the PoC server by sending a floor release request message 5-6 from the UE to PoC server) a respective timer is set to zero in the PoC server in step 5-7. The timer is set to expire after 10 seconds, for example. In the messages 5-8 and 5-9 the PoC server receives two simultaneous voice streams from $UE_{G1}$ and $UE_{G2}$ that are members of different communication groups G1, G2 respectively. According to the embodiment, in step 5-10 it is checked in the PoC server, whether either of groups G1, G2 is the current priority group for the UE. Here it is assumed that the timer set in step 5-7 has not yet been expired, and thus group G1 is the priority group for the UE. As a result the voice stream 5-8 coming from $UE_{G1}$ is transmitted 5-11 to the UE while the voice stream 5-9 coming from $UE_{G2}$ cannot be transmitted to the UE. After that, another voice stream is transmitted 5-12, 5-13 from the UE via the PoC server to G1 (e.g. to $UE_{G1}$). (In reality, the voice stream 5-12 is preceded by a floor request—floor granted procedure corresponding to steps 5-1 . . . 5-3 described above, but for reasons of clarity those steps are not shown here). After receiving a release request message 5-14, the timer is set to zero again in the PoC server in step 5-15. Then it is assumed that no response is received from any member of G1 during a predetermined time period, and the timer reset in step 5-15 expires 5-16. As a response to the expiring of the timer, the original priority group G2 is set as the priority communication group for the UE in step 5-17.

Figure 6:
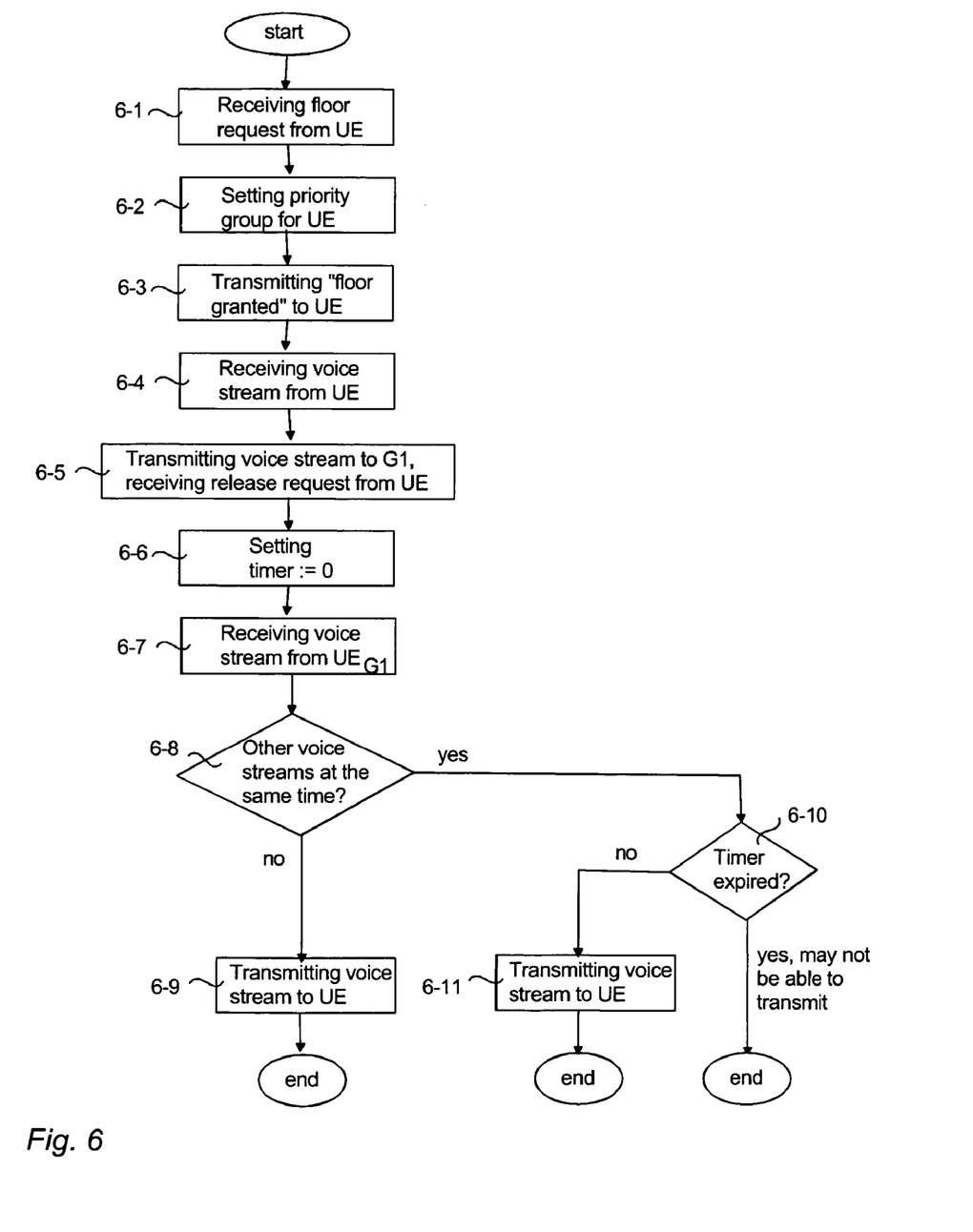
FIG. 6 is a flow chart illustrating the method according to a second embodiment of the present invention.

FIG. 6 illustrates, by way of example, the function of the PoC server according to a second embodiment of the present application. FIG. 6 shows a situation where a floor request message is received in the PoC server in step 6-1 from the user equipment UE. The received floor request message indicates the communication group the user wishes to speak to. Here it is assumed that the user wishes to speak to the communication group G1. It is further assumed that the UE is a member of two communication groups G1, G2, and G2 is originally the priority communication group for the UE. According to the second embodiment, the requested communication group, here G1, is set as the priority communication group for UE in step 6-2. After that a floor granted message is transmitted 6-3 from the PoC server to the UE, indicating that the floor request has been accepted. In step 6-4 a voice stream is received from the UE. In step 6-5 the voice stream is transmitted to the members of G1 participating the group call, e.g. to $UE_{G1}$, and a corresponding release request message is received from the UE. According to the second embodiment, as the release request message has been received in step 6-5, a respective timer is set to zero in the PoC server in step 6-6. In step 6-7 a voice stream is received from a member of the communication group G1, e.g. from $UE_{G1}$. In step 6-8, it is checked, whether the voice stream coming from $UE_{G1}$ is the only voice stream. If it is, it is transmitted to the UE in step 6-9. If there are other incoming voice streams, e.g. from $UE_{G2}$, it is checked in step 6-10, which is the priority group for the UE. If the timer set in step 6-6 has not expired, G1 is the priority group for the UE, and the voice stream from $UE_{G1}$ is forwarded to the UE in step 6-11. If the timer has expired, meaning that G2 (which was the original default priority group for the UE) has become the priority group for the UE, the voice stream coming from $UE_{G1}$ cannot be transmitted to the UE (instead the voice stream from $UE_{G2}$ is transmitted to the UE, not shown in FIG. 6).

In the first embodiment, the priority group is changed after the floor has been granted to the user terminal. In the second embodiment, the priority group is set after the user has requested the floor. Thus in the first embodiment, the priority group is changed only if the floor request can be accepted. In the second embodiment, the priority group is changed also in a case where the floor request cannot for some reason be accepted. By means of the first embodiment, an unnecessary change of the priority may be avoided for example in a case where the user sends two consecutive floor requests such that the floor has not yet been granted for a first request before a second request is received in the PoC server. However, a session may be of particular interest to the user even if his/her own related floor request was not accepted. Therefore, by means of the second embodiment, it can be assured that user receives the eventual communication from the other members of the requested group, even though the user him/herself was not granted the floor.

The steps and messages shown in FIGS. 3, 4, 5 and 6 are not in an absolute chronological order, and they can be executed in a different order from the one given. Other messages can be transmitted and/or other functions can be carried out between the steps. The messages are only examples and may include only some of the aforementioned information. The messages may also include other information. It is not essential for the invention, in which messages the information is transmitted or which functions are used, but other messages and/or functions can also be used than those described above.

According to yet another embodiment no "default" priority group is defined for the user, and the group, which the user has last spoken to, is set as the priority communication group for the user. When the priority-related timer expires, the system returns to the state in which no priority communication group is defined for the user.

According to yet another embodiment no "default" priority group is defined for the user, and the group, which the user has last spoken to, is set as the priority communication group for the user. In such a case the priority is valid until the user's next request to speak, and the setting of a priority-related timer as described above is not necessary.

According to yet another embodiment the priority-related timer expires if a predetermined number, e.g. 5, of voice streams have been transmitted in the session, and none of them have been initiated by the user himself/herself, or if a predetermined time period, e.g. 2 minutes, has passed.

The present solution enables the creation of a mechanism for setting the communication group, which the user is currently speaking to, as the priority communication group for the user. This enables temporary ignoring of eventual other priorities set. However the existing prioritization mechanisms may remain in the system. The solution enables user-specific prioritization of the communication groups, and it is an on-line method. No changes to existing user terminals are necessary for implementing the present solution, and no new signaling is required in the system.

In addition to prior art devices, the system, system nodes or mobile stations implementing the operation according to the invention comprise means for updating the threshold counters as described above and for storing information of the priority groups. The existing network nodes and terminals comprise processors and memory, which can be used in the functions according to the invention. All the changes needed to implement the invention can be carried out by means of software routines that can be added or updated and/or routines contained in application specific integrated circuits (ASIC) and/or programmable circuits, such as an electrically programmable logic device EPLD or a field programmable gate array FPGA.

It will be obvious to a person skilled in the art that, as the technology advances, the inventive concept can be implemented in various ways. The invention and its embodiments are not limited to the examples described above but may vary within the scope of the claims.

The invention claimed is:

1. A method for managing group voice communication in a telecommunications system comprising:
   a telecommunications network;
   a user terminal connected to the telecommunications network; and
   a communication server capable of providing the user terminal with access to group voice communication via the telecommunications network;
   the method comprising
   maintaining information of at least two communication groups available to the user terminal;
   receiving, in the communication server, a request message indicating a request from the user terminal to speak to a first communication group;
   transmitting, from the communication server to the user terminal, a grant message indicating an acceptance of said request;
   as a response to said transmitting, setting the first communication group as a priority communication group of a highest priority for said user terminal, wherein said setting of the priority communication group is temporary;
   maintaining information of a default priority communication group for the user terminal; and
   setting, as a response to an expiry of a temporary priority group, the default priority communication group as the priority communication group of the highest priority for the user terminal.

2. A telecommunications system for providing group voice communication comprising a telecommunications network;
a user terminal connected to the telecommunications network; and
a communication server capable of providing the user terminal with access to group voice communication via the telecommunications network;
the system being configured to maintain information of at least two communication groups available to the user terminal; and
the communication server being configured to
  receive a request message from the user terminal, said request message indicating a desire of the respective user terminal to speak to a first communication group;
  transmit a grant message to the user terminal, if said request message is acceptable; and
  based on the transmitted grant message, set the first communication group as a priority communication group of a highest priority for said user terminal, wherein said priority group setting is temporary.
  maintain information of a default priority communication group for the user terminal; and
  set, as a response to the termination of the temporary priority, the default priority communication group as the priority communication group of the highest priority for the user terminal.

3. A communication server for providing a user with access to group voice communication in a telecommunications system comprising a user terminal, wherein the communication server is configured to
  receive a request message from the user terminal indicating a desire of the respective user terminal to speak to a first communication group;
  transmit a grant message to the user terminal, if said request message is acceptable; and
  as a response to said transmitting, set the first communication group as a priority communication group of a highest priority for said user terminal
  the communication server being arranged, if at least two simultaneous voice streams are received from members of different communication groups, to transmit to the user terminal only the voice stream coming from the communication group of the highest priority for said user terminal wherein it is further arranged to
  terminate said priority group setting after a predetermined time period;
  maintain information of a default priority communication group for the user terminal; and
  set, as a response to a termination of a priority, the default priority communication group as the priority communication group of the highest priority for the user terminal.

4. A communication server for providing a user with access to group voice communication in a telecommunications system comprising a user terminal, the communication server comprising
  means for receiving a request message from a user terminal indicating a desire of the respective user terminal to speak to a first communication group;
  means for transmitting a grant message to the user terminal, if said request is acceptable; and
  means for setting, as a response to said transmitting, the first communication group as a priority communication group of the highest priority for said user terminal;
  means for terminating said priority group setting after a predetermined time period;
  means for maintaining information of a default priority communication group for the user terminal; and
  means for setting, as a response to a termination of the priority, the default priority communication group as the priority communication group of the highest priority for the user terminal.

5. A method for managing group voice communication in a telecommunications system comprising
  a telecommunications network;
  a user terminal connected to the network; and
  a communication server capable of providing the user terminal access to group voice communication via the network;
  the method comprising:
  maintaining information of at least two communication groups available to the user terminal;
  receiving, in the communication server, a message indicating a request from the user terminal to speak to a first communication group; and
  based on the received request message, setting the first communication group as a priority communication group of a highest priority for said user terminal, wherein said setting of the priority communication group is temporary;
  maintaining information of a default priority communication group for the user terminal; and
  setting, as a response to an expiry of the temporary priority group, the default priority communication group as the priority communication group of the highest priority for the user terminal.

6. A telecommunications system for providing group voice communication comprising:
  a telecommunications network;
  a user terminal connected to the network; and
  a communication server capable of providing the user terminal access to group voice communication via the network;
  wherein
  the system is configured to maintain information of at least two communication groups available to the user terminal; and
  the communication server is configured to, as a response to receiving a request message from the user terminal indicating a desire of the respective user terminal to speak to a first communication group, set the first communication group as a priority communication group of a highest priority for said user terminal, wherein said priority group setting is temporary; and
  the communication server is configured to
    terminate said priority group setting after a predetermined time period;
    maintain information of a default priority communication group for the user terminal; and
    set, as a response to a termination of the temporary priority, the default priority communication group as the priority communication group of the highest priority for the user terminal.

7. A communication server for providing a user with access to group voice communication in a telecommunications system comprising a user terminal, wherein the communication server is configured to
  receive a request message from a user terminal indicating a desire of the respective user terminal to speak to a first communication group; and
  as a response to said receiving, set the first communication group as a priority communication group of a highest priority for said user terminal;

terminate said priority group setting after a predetermined time period;

maintain information of a default priority communication group for the user terminal; and set, as a response to a termination of a priority, the default priority communication group as the priority communication group of the highest priority for the user terminal.

8. A communication server for providing a user with access to group voice communication in a telecommunications system comprising a user terminal, the communication server comprising:

means for receiving a request message from a user terminal indicating a desire of the respective user terminal to speak to a first communication group;

means for setting, as a response to said receiving, the first communication group as a priority communication group of a highest priority for said user terminal;

means for terminating said priority group setting after a predetermined time period;

means for maintaining information of a default priority communication group for the user terminal; and means for setting, as a response to a termination of a priority, the default priority communication group as the priority communication group of the highest priority for the user terminal.

* * * * *